(12) United States Patent
Yi et al.

(10) Patent No.: US 11,310,646 B2
(45) Date of Patent: Apr. 19, 2022

(54) BLUETOOTH-BASED PLAYBACK METHOD AND ELECTRONIC DEVICE

(71) Applicant: HUAWEI TECHNOLOGIES CO., LTD., Shenzhen (CN)

(72) Inventors: Tao Yi, Shenzhen (CN); Chang Hu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/043,665

(22) PCT Filed: Apr. 17, 2018

(86) PCT No.: PCT/CN2018/083432
§ 371 (c)(1),
(2) Date: Sep. 30, 2020

(87) PCT Pub. No.: WO2019/192030
PCT Pub. Date: Oct. 10, 2019

(65) Prior Publication Data
US 2021/0044952 A1 Feb. 11, 2021

(30) Foreign Application Priority Data
Apr. 4, 2018 (CN) .......................... 201810301279.5

(51) Int. Cl.
*H04W 4/80* (2018.01)
*H04R 3/00* (2006.01)
*H04W 52/02* (2009.01)

(52) U.S. Cl.
CPC .............. *H04W 4/80* (2018.02); *H04R 3/00* (2013.01); *H04W 52/0229* (2013.01); *H04R 2420/07* (2013.01)

(58) Field of Classification Search
CPC ............ H04B 2201/70703; H04B 1/69; H04B 1/707; H04B 7/0602; H04B 7/0854;
(Continued)

(56) References Cited

U.S. PATENT DOCUMENTS

| 8,654,982 B2 | 2/2014 | Mason et al. |
| 2014/0064735 A1* | 3/2014 | Thompson ......... H04N 21/4222 398/106 |

(Continued)

FOREIGN PATENT DOCUMENTS

| CN | 103841493 A | 6/2014 |
| CN | 104007977 A | 8/2014 |

(Continued)

*Primary Examiner* — Ajibola A Akinyemi
(74) *Attorney, Agent, or Firm* — Rimon PC (57) ABSTRACT

Various embodiments provide a Bluetooth-based playback method and an electronic device. In those embodiments, a first processor copies a coding algorithm, a sound effect postprocessing program, and a Bluetooth audio transmission protocol to a second processor, transmits first to-be-decoded data to the second processor, and enters a sleep state. The second processor receives the first to-be-decoded data, performs decoding, sound effect post-processing, and coding on the first to-be-decoded data to obtain first coded data, and sends the first coded data to a Bluetooth module using a third processor. The Bluetooth module converts the first coded data into a first wireless signal, and sends the first wireless signal to an external playback device to implement audio playback. The first processor is communicatively connected to the second processor, the second processor is communicatively connected to the third processor, and the third processor is communicatively connected to the Bluetooth module.

17 Claims, 6 Drawing Sheets

(58) Field of Classification Search
CPC .................. H04B 10/1121; H04B 1/30; H04B 2201/70707; H04B 7/04; H04B 1/04; H04B 1/16; H04B 1/525; H04B 7/0617; H04B 7/0871
USPC .......................................................... 455/73
See application file for complete search history.

(56) References Cited

U.S. PATENT DOCUMENTS

| | | | |
|---|---|---|---|
| 2015/0356979 A1* | 12/2015 | Li | G10L 19/04 |
| | | | 704/500 |
| 2018/0279050 A1* | 9/2018 | Ryu | G10L 19/00 |
| 2019/0238152 A1* | 8/2019 | Pagnanelli | H03M 3/502 |
| 2019/0386868 A1* | 12/2019 | Jiang | H04L 27/364 |

FOREIGN PATENT DOCUMENTS

| | | |
|---|---|---|
| CN | 105589336 A | 5/2016 |
| CN | 106341571 A | 1/2017 |
| WO | 2014051411 A1 | 4/2014 |

* cited by examiner

BLUETOOTH-BASED PLAYBACK METHOD AND ELECTRONIC DEVICE

CROSS-REFERENCE TO RELATED APPLICATIONS

This application is a National Stage of International Patent Application No. PCT/CN2018/083432 filed on Apr. 17, 2018, which claims priority to Chinese Patent Application No. 201810301279.5, filed on Apr. 4, 2018. Both of the aforementioned applications are hereby incorporated by reference in their entireties.

TECHNICAL FIELD

This application relates to the field of Bluetooth technologies, and in particular, to a Bluetooth-based playback method and an electronic device.

BACKGROUND

With development of Bluetooth technologies, an electronic device such as a mobile phone having a Bluetooth connection function can support music playback by a playback device such as a headset connected to the electronic device over Bluetooth. A mobile phone is used as an example. An application processor in the mobile phone may transmit to-be-decoded data such as to-be-decoded data in an MP3 (Moving Picture Experts Group Audio Layer-3) format to a digital signal processor (Digital Signal Processor, DSP) for decoding. Then, the digital signal processor performs sound effect postprocessing on data obtained after the decoding, and sends data obtained after the sound effect postprocessing to the application processor. After processing the data transmitted by the digital signal processor, a Bluetooth protocol stack that is run in the application processor sends the data to a Bluetooth chip, and the Bluetooth chip transmits the received data to a playback device in a form of a wireless signal, to play music over Bluetooth.

In a process of playing music over Bluetooth, the application processor not only needs to transmit to-be-decoded data to the digital signal processor, but also needs to further process data transmitted by the digital signal processor. Therefore, in the process of playing music over Bluetooth, the application processor inside the mobile phone continuously works, and consequently a large amount of power consumption is generated.

SUMMARY

Various embodiments provide a Bluetooth-based playback method and an electronic device, to resolve a problem that an application processor generates a large amount of power consumption.

To achieve the foregoing objective, embodiments of this application use the following technical solutions:

According to a first aspect, one embodiment provides a Bluetooth-based playback method. The method is applied to an electronic device. The electronic device includes a first processor, a second processor, a third processor, and a Bluetooth module. The first processor is communicatively connected to the second processor, the second processor is communicatively connected to the third processor, and the third processor is communicatively connected to the Bluetooth module. The method includes: The first processor copies a coding algorithm, a sound effect postprocessing program, and a Bluetooth audio transmission protocol to the second processor, transmits first to-be-decoded data to the second processor, and then enters a sleep state. The first to-be-decoded data is audio data that is to be played by using an external Bluetooth playback device. The second processor receives the first to-be-decoded data, performs decoding, sound effect postprocessing, and coding on the first to-be-decoded data to obtain first coded data, and then sends the first coded data to the Bluetooth module by using the third processor. The Bluetooth module converts the first coded data into a first wireless signal, and sends the first wireless signal to an external playback device of the electronic device that is communicatively connected to the electronic device over Bluetooth, to implement audio playback. The electronic device is communicatively connected to the playback device over Bluetooth.

It can be learned that, after the first processor transmits the first to-be-decoded data to the second processor, the first processor may enter a sleep state. After the second processor processes the first to-be-decoded data, the second processor may forward the first coded data by using the third processor, in other words, forward the first coded data that is obtained by the second processor by processing the first to-be-decoded data to the Bluetooth module. Then the Bluetooth module converts the first coded data into the first wireless signal, and sends the first wireless signal to the external playback device of the electronic device to implement audio playback. It should be noted that power consumption generated when the third processor forwards data is less than power consumption generated when the first processor is in a working state. Therefore, after the first processor enters a sleep state, overall power consumption of the electronic device is reduced in a process of ensuring that the first to-be-decoded data is processed to obtain the first coded data and then the first coded data is forwarded. This resolves a problem that the first processor generates a large amount of power consumption.

In an implementation, after the first processor enters a sleep state, the first processor is woken up when a preset time interval expires. When the first processor determines that there is second to-be-decoded data, the first processor transmits the second to-be-decoded data to the second processor, where the second to-be-decoded data is to-be-played audio data. The second processor receives and processes the second to-be-decoded data to obtain second coded data, and sends the second coded data to the Bluetooth module by using the third processor. The Bluetooth module converts the second coded data into a second wireless signal, and sends the second wireless signal to the playback device. That the second processor processes the second to-be-decoded data includes: performing decoding, sound effect postprocessing, and coding on the second to-be-decoded data to obtain the second coded data.

To ensure audio data playback quality and ensure continuous audio data playback, the first processor may be woken up when the first processor enters a sleep state and the preset time interval expires. In other words, when the first processor has the second to-be-decoded data, it can be ensured that the first processor continues to send the second to-be-decoded data to the second processor, and the first processor continues to enter a sleep state after the first processor transmits the second to-be-decoded data. Similar to the implementation in the foregoing example, the second processor processes the second to-be-decoded data in a manner of processing the first to-be-decoded data, and finally the Bluetooth module converts the second coded data obtained after the second to-be-decoded data is processed into the second wireless signal, and then sends the second wireless signal to the playback device.

It can be learned that, for the first processor, the first processor switches between a working state and a sleep state. When the first processor is in a sleep state, power consumption generated by the electronic device can be effectively reduced. However, when the first processor is in a working state, a working progress of the first processor can be ensured.

In an implementation, after the first processor transmits the second to-be-decoded data to the second processor, the first processor enters a sleep state.

In an implementation, after the first processor enters a sleep state, the first processor receives a signal used to indicate that the electronic device receives an incoming call request. Then the first processor is woken up. The first processor stops audio playback, retains current audio playback data, and switches to a call voice program.

It should be noted that, after the first processor stops the audio playback, to ensure that the first processor can effectively reply to, after a call ends, audio data that is not played, the first processor may retain the current audio playback data, and switch to the call voice program, to implement functions such as an incoming call answering function.

In an implementation, after the first processor switches to the call voice program, after a call ends, the first processor resumes audio playback, and sends a next segment of to-be-decoded data to the second processor. In other words, after the call ends, the first processor may effectively resume an audio playback process, and process the next segment of to-be-decoded data in the processing manner proposed in the foregoing example implementations.

In an implementation, the first processor may be an application processor.

In an implementation, the second processor may be a digital signal processor.

In an implementation, the third processor may be a microprocessor, for example, a sensor hub, and power consumption generated when the third processor is in a working state is less than the power consumption generated when the first processor is in a working state.

According to a second aspect, one embodiment provides an electronic device. The electronic device includes a first processor, a second processor, a third processor, and a Bluetooth module. The first processor, the second processor, the third processor, and the Bluetooth module cooperate to implement the method according to any one of the first aspect and the implementations of the first aspect.

According to a third aspect, one embodiment provides an electronic device. A structure of the electronic device includes a display, a memory, one or more processors, a plurality of application programs, and one or more programs. The one or more programs are stored in the memory, and when the one or more processors execute the one or more programs, the electronic device is enabled to implement the method according to any one of the first aspect and the implementations of the first aspect.

According to a fourth aspect, one embodiment provides a readable storage medium, including an instruction. When the instruction is run on an electronic device, the electronic device is enabled to perform the method according to any one of the first aspect and the implementations of the first aspect.

According to a fifth aspect, one embodiment provides a computer program product. The computer program product includes software code, and the software code is used to perform the method according to any one of the first aspect and the implementations of the first aspect.

DESCRIPTION OF EMBODIMENTS

Figure 1:
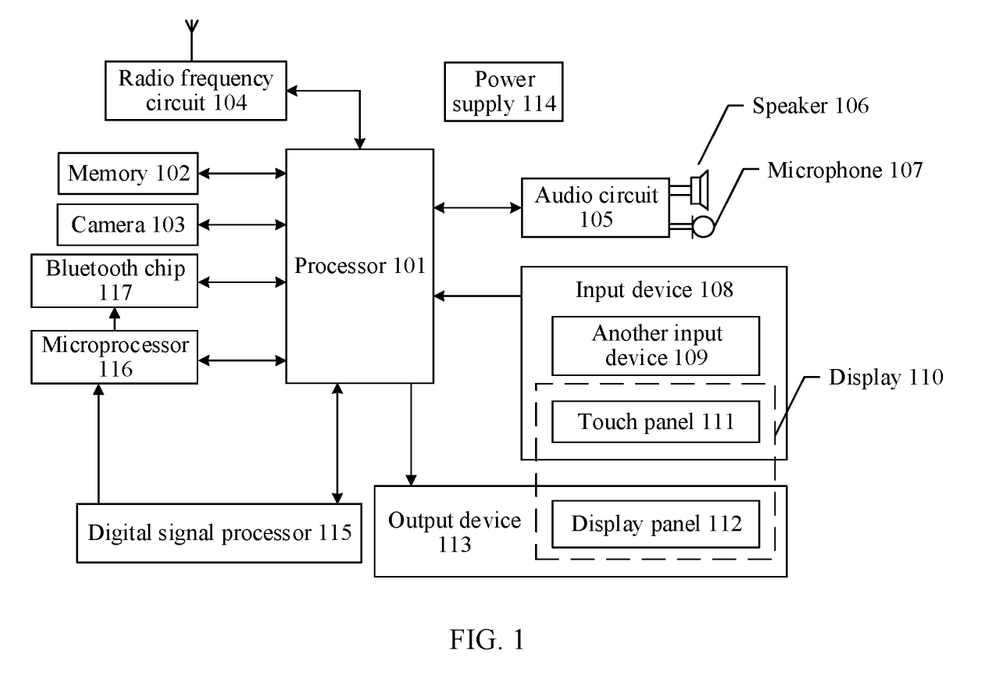
FIG. 1 is a schematic structural diagram 1 of an electronic device according to one embodiment.

The embodiments of this application may be applied to an electronic device. The electronic device may include a device such as a notebook computer, a smartphone, a virtual reality (Virtual Reality, VR) device, an augmented reality (Augmented Reality, AR) device, a vehicle-mounted device, or an intelligent wearable device. The electronic device may be provided with at least a display, an input device, and a processor. An electronic device 100 is used as an example. As shown in FIG. 1, the electronic device 100 includes components such as a processor 101, a memory 102, a camera 103, an RF circuit 104, an audio circuit 105, a speaker 106, a microphone 107, an input device 108, another input device 109, a display 110, a touch panel 111, a display panel 112, an output device 113, and a power supply 114. The display 110 includes at least the touch panel 111 serving as an input device and the display panel 112 serving as an output device. It should be noted that a structure of the electronic device shown in FIG. 1 constitutes no limitation on the electronic device, and the electronic device 100 may include more or fewer components than those shown in the figure, or combine some components, or split some components, or have different component arrangements. This is not limited herein.

The following describes each constitution component of the electronic device 100 in detail with reference to FIG. 1.

The radio frequency (Radio Frequency, RF) circuit 104 may be configured to receive and send a signal in an information receiving and sending process or in a call process. For example, if the electronic device 100 is a mobile phone, the electronic device 100 may transmit, by using the radio frequency circuit 104 after receiving downlink information sent by a base station, the downlink information to the processor 101 for processing, and send related uplink data to the base station. The RF circuit generally includes but is not limited to an antenna, at least one amplifier, a transceiver, a coupler, a low noise amplifier (Low Noise Amplifier, LNA), a duplexer, and the like. In addition, the radio frequency circuit 104 may further communicate with a network and another device through wireless communication. The wireless communication may use any communication standard or protocol, including but not limited to a global system for mobile communications (Global System for Mobile communication, GSM), a general packet radio service (General Packet Radio Service, GPRS), code division multiple access (Code Division Multiple Access, CDMA), wideband code division multiple access (Wideband Code Division Multiple Access, WCDMA), long term evolution (Long Term Evolution, LTE), an email, a short message service (Short Messaging Service, SMS), and the like.

The memory 102 may be configured to store a software program and a module. The processor 101 runs the software program and the module that are stored in the memory 102, to perform various function applications of the electronic device 100 and data processing. The memory 102 may mainly include a program storage area and a data storage area. The program storage area may store an operating system, an application program required by at least one function (for example, a sound playback function or an image play function), and the like. The data storage area may store data (for example, audio data or video data) created when the electronic device 100 is used, and the like. In addition, the memory 102 may include a high-speed random access memory, or may include a nonvolatile memory, such as at least one magnetic disk storage device, a flash memory, or another volatile solid-state storage device.

The another input device 109 may be configured to: receive input digital or character information; and generate a key signal input related to a user setting and function control of the electronic device 100. Specifically, the another input device 109 may include but is not limited to one or more of a physical keyboard, a function key (such as a volume control key or an on/off key), a tracking ball, a mouse, a joystick, an optical mouse (the optical mouse is a touch-sensitive surface that does not display a visual output, or an extension of a touch-sensitive surface formed by a touchscreen), and the like. The another input device 109 may further include a sensor built in the electronic device 100, such as a gravity sensor or an acceleration sensor, and the electronic device 100 may further use a parameter detected by a sensor as input data.

The display 110 may be configured to display information entered by a user or information provided for a user, and various menus of the electronic device 100, and may further receive a user input. In addition, the display panel 112 may be configured in a form of a liquid crystal display (Liquid Crystal Display, LCD), an organic light-emitting diode (Organic Light-Emitting Diode, OLED), or the like. The touch panel 111, also referred to as a touchscreen, a touch-sensitive screen, or the like, may collect a touch or non-touch operation (for example, an operation performed by the user on the touch panel 111 or near the touch panel 111 by using any proper object or accessory such as a finger or a stylus, or a motion sensing operation including an operation type such as a single-point control operation or a multipoint control operation) performed by the user on or near the touch panel 111, and drive a corresponding connection apparatus based on a preset program. It should be noted that the touch panel 111 may further include two parts: a touch detection apparatus and a touch controller. The touch detection apparatus detects a touch orientation and gesture of the user, detects a signal brought by a touch operation, and transmits the signal to the touch controller. The touch controller receives touch information from the touch detection apparatus, converts the touch information into information that can be processed by the processor 101, and then sends the information to the processor 101. In addition, the touch controller may further receive and execute a command sent by the processor 101. Moreover, the touch panel 111 may be implemented in a plurality of types, such as a resistive type, a capacitive type, an infrared ray type, and a surface acoustic wave type, or the touch panel 111 may be implemented by using any technology developed in the future. Generally, the touch panel 111 may cover the display panel 112. The user may perform, based on content displayed on the display panel 112 (the displayed content includes but is not limited to a soft keyboard, a virtual mouse, a virtual key, an icon, and the like), an operation on or near the touch panel 111 that covers the display panel 112. After detecting the operation on or near the touch panel 111, the touch panel 111 sends the operation to the processor 101 to determine the user input, and then the processor 101 provides a corresponding visual output on the display panel 112 based on the user input. In FIG. 1, the touch panel 111 and the display panel 112 are used as two independent components to implement input and output functions of the electronic device 100. However, in some embodiments, the touch panel 111 and the display panel 112 may be integrated to implement the input and output functions of the electronic device 100.

The radio frequency circuit 104, the speaker 106, and the microphone 107 may provide an audio interface between the user and the electronic device 100. The audio circuit 105 may transmit, to the speaker 106, a signal obtained by converting received audio data, and the speaker 106 converts the signal into a sound signal for output. In addition, the microphone 107 may convert a collected sound signal into a signal. The audio circuit 105 receives the signal, converts the signal into audio data, and then outputs the audio data to the RF circuit 104, to send the audio data to, for example, another electronic device, or outputs the audio data to the memory 102, so that the processor 101 performs further processing based on content stored in the memory 102. Moreover, the camera 103 may collect an image frame in real time and send the image frame to the processor 101 for processing, and store a processed result in the memory 102 and/or display the processed result to the user by using the display panel 112.

The processor 101 is a control center of the electronic device 100. The processor 101 is connected to all parts of the entire electronic device 100 by using various interfaces and lines, and performs various functions of the electronic device 100 and data processing by running or executing the software program and/or the module stored in the memory 102 and invoking data stored in the memory 102, to perform overall monitoring on the electronic device 100. It should be noted that the processor 101 may include one or more processing units. The processor 101 may further integrate an application processor and a modem processor. The application processor mainly processes an operating system, a user interface (UI), an application program, and the like. The modem processor mainly processes wireless communication. It can be understood that the modem processor may alternatively not be integrated into the processor 101.

The electronic device 100 may further include the power supply 114 (for example, a battery) that supplies power to each component. In the embodiments of this application, the power supply 114 may be logically connected to the processor 101 by using a power management system, to implement functions such as charging management, discharging management, and power consumption management by using the power management system.

In various embodiments, the electronic device 100 may further include a digital signal processor 115, a microprocessor 116, and a Bluetooth chip 117. The processor 101 may transmit to-be-decoded data to the signal processor 115 to perform operations such as decoding and sound effect postprocessing, and then the signal processor may transmit processed data to the processor 101 or the microprocessor 116 for processing. After completing the data processing, the processor 101 or the microprocessor 116 may transmit processed data to the Bluetooth chip 117, so that the Bluetooth chip 117 converts the received data into a wireless signal for sending, to implement a Bluetooth play function of the electronic device 100. The sound effect postprocessing is performing processing on decoded data by changing an audio style, adding an audio special effect, or the like.

In addition, there are components that are not shown in FIG. 1. Details are not described herein.

The following describes the technical solutions provided in various embodiments by using an example in which the electronic device 100 is a mobile phone.

Figure 2:
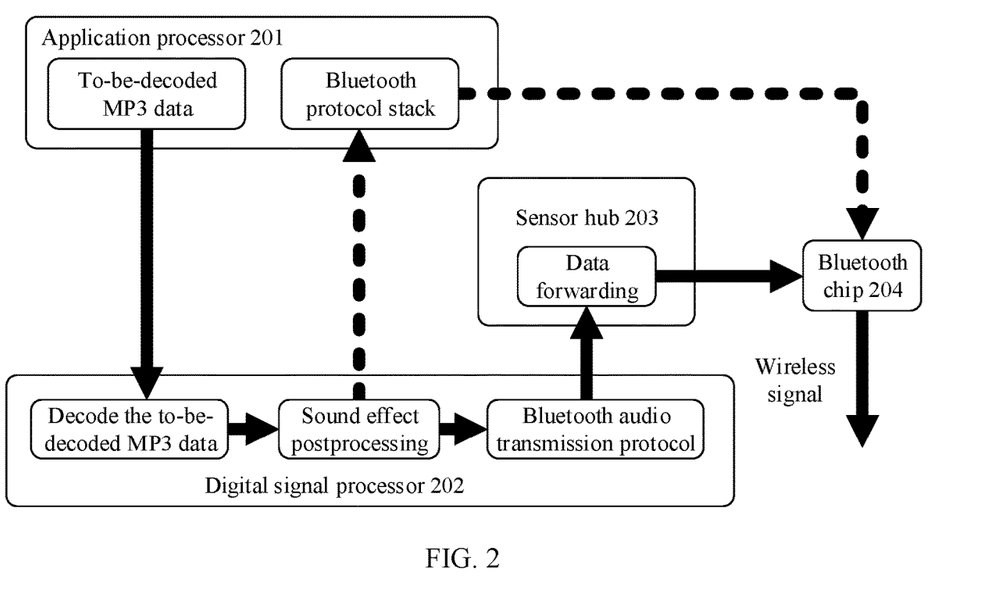
FIG. 2 is a schematic structural diagram 2 of an electronic device according to one embodiment.

FIG. 2 is a schematic structural diagram of an example mobile phone according to one embodiment. The mobile phone includes an application processor 201 (for example, an implementation of a first processor), a digital signal processor 202 (for example, an implementation of a second processor), a sensor hub 203 (for example, an implementation of a third processor), and a Bluetooth chip 204 (for example, an implementation of a Bluetooth module). The application processor 201 is an implementation of the processor 101 in FIG. 1, the digital signal processor 202 is the digital signal processor 115 in FIG. 1, the sensor hub 203 is an implementation of the microprocessor 116 in FIG. 1, and the Bluetooth chip 204 is the Bluetooth chip 117 in FIG. 1.

The sensor hub 203 may be configured to manage a sensor in the mobile phone, for example, one or more of a gravity sensor, an acceleration sensor, and an infrared sensor. The sensor hub 203 may be specifically configured to access data collected by the sensor, monitor a working state of the sensor, or the like. A function implemented by the sensor hub 203 in the mobile phone is not limited herein.

In an implementation of this embodiment of this application, a Bluetooth audio transmission protocol (Advanced Audio Distribution Profile, A2DP) in a Bluetooth protocol stack that is run in the application processor 201 may be mirrored to the digital signal processor 202. In other words, the entire Bluetooth protocol stack is still run in the application processor 201. For the mobile phone, two Bluetooth audio transmission protocols are run in the mobile phone. One Bluetooth audio transmission protocol is originally located in the Bluetooth protocol in the application processor 201, in other words, is run in the application processor 201. The other Bluetooth audio transmission protocol is run in the digital signal processor 202. It should be noted that this application is described by using an example of playing music over Bluetooth, and music may be replaced with any other audio data. In a process of playing music over Bluetooth, the Bluetooth audio transmission protocol may be used to transmit audio data based on Bluetooth communication, for example, may be applied to an external playback device of an electronic device, such as a Bluetooth headset or a Bluetooth speaker box.

In this embodiment, an implementation provided in this embodiment may be used in a process of processing to-be-decoded data that needs to be decoded by the digital signal processor 202. The to-be-decoded data that needs to be decoded by the digital signal processor 202 includes data in a compression format, for example, audio data in an MP3 format such as music in an MP3 format.

As shown in FIG. 2, when the mobile phone has established a Bluetooth connection to a playback device such as a headset, in a process in which the mobile phone starts to play music or the mobile phone is playing music, for example, music in an MP3 format, the application processor 201 transmits to-be-decoded MP3 data to the digital signal processor 202, and the digital signal processor 202 decodes the to-be-decoded MP3 data sent by the application processor 201, in other words, decodes received original data to obtain pulse code modulation (PCM) data. Subsequently, the digital signal processor 202 performs sound effect postprocessing on the pulse code modulation data, and performs, by using the Bluetooth audio transmission protocol, sub-band coding (SBC) processing on data obtained by performing the sound effect postprocessing, to obtain sub-band coded data. The digital signal processor 202 forwards, by using the sensor hub 203, the obtained sub-band coded data to the Bluetooth chip 204 through a transmission path between the digital signal processor 202 and the sensor hub 203 and a transmission path between the sensor hub 203 and the Bluetooth chip 204. The Bluetooth chip 204 performs data conversion on the sub-band coded data to obtain a wireless signal, and transmits, by using the Bluetooth chip 204, the wireless signal to the playback device that establishes the Bluetooth connection to the mobile phone.

In an implementation, the digital signal processor 202 may select to forward the sub-band coded data from the digital signal processor 202 for one or more times through another transmission path used to transmit data of the digital signal processor 202 to the Bluetooth chip 204, to transmit the sub-band coded data to the Bluetooth chip 204. However, this is not limited to the foregoing implementation of forwarding the sub-band coded data by using the sensor hub 203. In another implementation, when there is a transmission path between the digital signal processor 202 and the Bluetooth chip 204, the digital signal processor 202 may transmit, to the Bluetooth chip 204 without a need of additional forwarding by another device such as the sensor hub 203, the sub-band coded data obtained after processing by using the Bluetooth audio transmission protocol.

In a process of playing music over Bluetooth, after transmitting to-be-decoded data to the digital signal processor, the application processor may enter a sleep state. Subsequently, the digital signal processor performs operations such as decoding, sound effect postprocessing, and sub-band coding on the to-be-decoded data, and then forwards data obtained by performing the foregoing operations to the Bluetooth chip by using the sensor hub, so that the Bluetooth chip outputs a wireless signal, and therefore music is played over Bluetooth. It should be noted that, after the application processor enters a sleep state, power consumption generated by the application processor is greatly reduced. When the application processor has to-be-decoded data that needs to be subsequently processed by using the Bluetooth protocol stack that is run in the application processor, after the application processor transmits the to-be-decoded data to the digital signal processor, the application processor is still in a working state. In addition, after the application processor receives decoded data transmitted by the digital signal processor, the application processor performs sub-band coding on the received data, and the Bluetooth chip converts data into a wireless signal for output. This implements a process of playing content such as a call over Bluetooth in addition to music.

That the application processor is in a sleep state means that the application processor is currently in a non-working state. For example, in an implementation, when the mobile phone is in a screen-locked state or a screen-off state, the mobile phone may not run a program that needs to be executed by the application processor. In this case, the application processor is in a sleep state. When the application processor has data that needs to be sent or processed by the application processor, the application processor may be woken up and enter a working state. For example, in an implementation, after the mobile phone is in a screen-locked state or a screen-off state, when the mobile phone receives an incoming call, to be specific, when the mobile phone serves as a called device and another electronic device having a call capability such as a mobile phone serves as a calling device and initiates a call process, the mobile phone serving as the called device responds to the incoming call, and therefore the application processor is woken up from a sleep state and enters a working state.

In an implementation, in a process in which the mobile phone plays music over Bluetooth, after the application processor transmits to-be-decoded data, the application processor enters a sleep state. This reduces power consumption generated by the application processor. For example, to-be-played music in an MP3 format includes a plurality of segments of to-be-decoded data, and the plurality of segments of to-be-decoded data may be sent by the application processor to the digital signal processor in a decoding sequence required for playing music. For example, the music in an MP3 format includes three segments of to-be-decoded data: first to-be-decoded data, second to-be-decoded data, and third to-be-decoded data. The application processor transmits the first to-be-decoded data to the digital signal processor, and the digital signal processor performs decoding, sound effect postprocessing, and sub-band coding operations on the first to-be-decoded data.

It is considered that the application processor periodically completes sending of the three segments of to-be-decoded data at a specific time interval (that is, a preset time interval), and duration of sending each segment of to-be-decoded data is usually less than an interval for transmitting two segments of to-be-decoded data. Therefore, the application processor may enter a sleep state after the application processor transmits the first to-be-decoded data, and when a time of transmitting the second to-be-decoded data arrives, the application processor is woken up and transmits the second to-be-decoded data. Subsequently, the application processor enters a sleep state again and is woken up again when a time of transmitting a next segment of to-be-decoded data arrives, until the application processor completes sending of the three segments of to-be-decoded data. Then the application processor may enter a sleep state again.

For example, a time interval at which the application processor transmits the music is preset to 100 milliseconds (ms), and the application processor needs to spend 50 milliseconds in transmitting each segment of to-be-decoded data. After the application processor transmits the first to-be-decoded data, the application processor enters a sleep state for 50 milliseconds (in other words, the time interval for transmitting the music minus the duration occupied for transmitting each segment of to-be-decoded data: 100 milliseconds minus 50 milliseconds), and then is woken up. After transmitting the second to-be-decoded data, the application processor enters a sleep state again for 50 milliseconds, then is woken up again, and transmits the third to-be-decoded data.

The time interval (for example, 100 milliseconds) for transmitting the to-be-decoded data and the duration (for example, 50 milliseconds) occupied for transmitting each segment of to-be-decoded data are example descriptions and are not intended to limit this embodiment of this application, and may be alternatively set to other values. It should be noted that the foregoing time interval is greater than the duration occupied for transmitting each segment of to-be-decoded data. In this embodiment of this application, all segments of to-be-decoded data may be transmitted within completely the same, partially the same, or completely different duration. This is not limited herein. Similarly, every two segments of adjacent to-be-decoded data that need to be transmitted may also be transmitted at completely the same, partially the same, or completely different time intervals. This is not limited herein. In other words, it needs to be ensured that duration occupied for transmitting the first to-be-decoded data is less than a time interval for transmitting the first to-be-decoded data and the second to-be-decoded data.

It should be noted that, in this embodiment, it is considered that a case in which the application processor enters a sleep state does not occur when the duration occupied for transmitting the first to-be-decoded data is equal to the time interval for transmitting the first to-be-decoded data and the second to-be-decoded data. Therefore, a manner of playing music over Bluetooth provided in the prior art may be used in this case.

It can be learned that, for the application processor, in a process in which the application processor plays music over Bluetooth, a working state of the application processor may change frequently. In other words, the application processor may switch between a working state and a sleep state, and each time the application processor enters a sleep state, power consumption can be effectively reduced.

In a process in which the application processor further needs to implement another service over Bluetooth in addition to playing music, the application processor may perform the another service over Bluetooth within a time saved by playing music (that is, duration in which the application processor is in a sleep state), so that resources saved by the application processor are applied to the another service. This improves working efficiency of the application processor, and implements more service processing processes by using limited resources of the application processor.

When the mobile phone needs to switch from played music to another piece of music, or when the mobile phone receives an incoming call from another device and a user selects to answer the incoming call, the application processor may be woken up and enter a working state because the playback device is still connected to the mobile phone over Bluetooth and a function currently invoked by the mobile phone needs to be performed by using a parameter of the Bluetooth protocol stack that is run in the application processor.

It can be learned that, in a process of playing music over Bluetooth, decoded data may be processed by using the Bluetooth audio transmission protocol that is run in the digital signal processor, and the decoded data does not need to be transmitted to the Bluetooth protocol stack in the application processor for processing. Therefore, in a process in which the digital signal processor performs decoding and sound effect postprocessing on to-be-decoded data and processes decoded data by using the Bluetooth audio transmission protocol, the application processor may be in a sleep state. This reduces power consumption of the application processor. In addition, although power consumption is generated when the sensor hub implements data forwarding, the generated power consumption is less than power consumption generated by the application processor in a normal working process. Therefore, power consumption of the mobile phone can be effectively reduced because the digital signal processor implements a sub-band coding process and the sensor hub forwards sub-band coded data.

When the mobile phone has established a Bluetooth connection to a playback device such as a headset, and when the mobile phone switches from a playback process of one piece of music to a playback process of another piece of music, or when the mobile phone pauses a playback process of current music, or when the mobile phone plays content over Bluetooth in addition to music, for example, a Bluetooth call service, the application processor 201 transmits to-be-decoded data to the digital signal processor 202, and the digital signal processor 202 decodes the received to-be-decoded data, selectively performs sound effect postprocessing on decoded data, and then transmits processed data or decoded data to the application processor 201. The mobile phone performs, by using the Bluetooth protocol stack that is run in the application processor 201, sub-band coding processing on the data transmitted by the digital signal processor 202, to obtain sub-band coded data. Then the application processor 201 transmits the sub-band coded data to the Bluetooth chip 204, so that the Bluetooth chip 204 converts the sub-band coded data into a wireless signal, and transmits the wireless signal to the playback device that establishes the Bluetooth connection to the mobile phone.

It can be learned that, for the Bluetooth chip, the Bluetooth chip may receive the sub-band coded data sent by the application processor or the sensor hub; or when there is a transmission path between the Bluetooth chip and the digital signal processor, the Bluetooth chip may receive the sub-band coded data sent by the application processor or the digital signal processor. In this embodiment of this application, sources of two or more paths of data that can be received by the Bluetooth chip are not limited.

It should be noted that, when a memory of the digital signal processor has sufficient controls that can be used, the application processor may further copy, to the digital signal processor, one or more of a Bluetooth protocol used by the mobile phone to switch from a playback process of one piece of music to a playback process of another piece of music, a Bluetooth protocol used for pausing a playback process of current music, and a Bluetooth protocol used by the mobile phone to play content over Bluetooth in addition to music. Therefore, it can also be ensured that the application processor enters a sleep state in the foregoing implementation process. This reduces power consumption of the mobile phone.

In this embodiment, an example in which the application processor uses the Bluetooth audio transmission protocol as a Bluetooth protocol copied to the digital signal processor is used for description. However, this is not limited to a case of copying a Bluetooth protocol other than the Bluetooth audio transmission protocol to the digital signal processor, or is not limited to a case of copying the Bluetooth audio transmission protocol and another Bluetooth protocol to the digital signal processor. It should be noted that content such as a protocol copied to the digital signal processor may be content stored by the digital signal processor in the memory.

Figure 3:
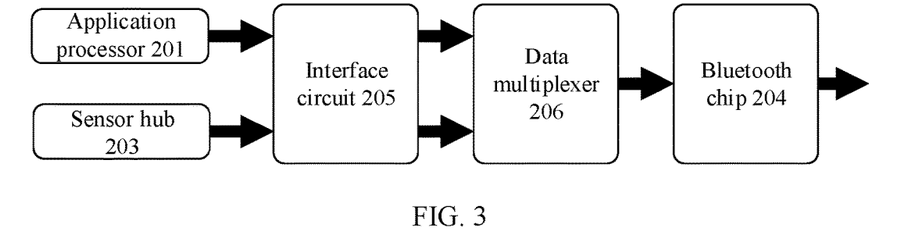
FIG. 3 is a schematic structural diagram 3 of an electronic device according to one embodiment.

For example, the Bluetooth chip may receive sub-band coded data sent by the application processor or the Sensor Hub. FIG. 3 is a schematic diagram of an example connection relationship between the Bluetooth chip 204, the application processor 201, and the sensor hub 203. In other words, the mobile phone further includes an interface circuit 205 and a data multiplexer (multiplexer, MUX) 206.

Both the application processor 201 and the sensor hub 203 are connected to the data multiplexer 206 by using the interface circuit 205. In other words, the application processor 201 may send data to the data multiplexer 206 by using the interface circuit 205. Similarly, the sensor hub 203 may send data to the data multiplexer 206 by using the interface circuit 205. For the data multiplexer 206, the data multiplexer 206 may separately receive sub-band coded data from the application processor 201 and the sensor hub 203, and transmit, to the Bluetooth chip 204 by using the data multiplexer 206, the sub-band coded data transmitted by the application processor 201 or the sensor hub 203.

It is considered that the Bluetooth chip 204 may receive one path of data. However, in an implementation of this embodiment of this application, the Bluetooth chip 204 needs to receive data transmitted by the application processor 201 and data transmitted by the sensor hub 203. Therefore, the two paths of data are converted into one path of data by using the data multiplexer 206, and the one path of data is transmitted to the Bluetooth chip 204. In other words, in a data transmission process, the data multiplexer 206 may transmit different sources of sub-band coded data to the Bluetooth chip 204 at different moments, so that the Bluetooth chip 204 converts the sub-band coded data into a wireless signal, and subsequently outputs the wireless signal.

In this embodiment, the data multiplexer 206 may be controlled by the application processor 201. In other words, when the data multiplexer 206 receives data transmitted by the application processor 201, the data multiplexer 206 forwards, to the Bluetooth chip 204, the data transmitted by the application processor 201. When the data multiplexer 206 does not receive data transmitted by the application processor 201, and receives data transmitted by the sensor hub 203, the data multiplexer 206 forwards, to the Bluetooth chip 204, the data transmitted by the sensor hub 203. It can be learned that, in this embodiment of this application, the data multiplexer 206 may convert multi-path input data into one path of data for output, which is equivalent to a switch circuit. The data multiplexer 206 selectively inputs different sources of data to the Bluetooth chip 204 based on control of the application processor 201, to ensure that the Bluetooth chip 204 can process, when the Bluetooth chip 204 keeps one path of input and one path of output, data sent by two data sources.

In this embodiment, the data multiplexer 206 is equivalent to a multiplexing circuit. When the application processor 201 or the sensor hub 203 needs to transmit data to the Bluetooth chip 204, the application processor 201 or the sensor hub 203 may apply to the multiplexing circuit for access permission, in other words, permission to access the Bluetooth chip 204, for example, permission to transmit sub-band coded data to the Bluetooth chip 204. It is considered that, in all Bluetooth functions in addition to a music playback function, the Bluetooth protocol stack that is run in the application processor needs to be used to implement sub-band coding. Therefore, in this embodiment of this application, compared with the application processor 201, the sensor hub 203 has relatively low access permission. For example, permission of the application processor 201 to transmit data to the Bluetooth chip 204 is higher than permission of the sensor hub 203 to transmit data to the Bluetooth chip 204. Therefore, when the application processor transmits data to the data multiplexer 206 by using the interface circuit 205, the data multiplexer 206 determines that the application processor currently applies for the permission to transmit data to the Bluetooth chip 204, and grants the access permission to the application processor 201. In other words, even if the sensor hub 203 transmits, with the help of the data multiplexer 206, data to the Bluetooth chip 204 by using the interface circuit 205, the data multiplexer 206 stops sending, to the Bluetooth chip 204, the data transmitted by the sensor hub 203, and forwards, to the Bluetooth chip 204 for processing, data transmitted by the application processor 201. In other words, the data multiplexer 206 mixes two paths of inputs, and selectively disables one of the two paths of inputs based on control of the application processor 201, to ensure one path of input to the Bluetooth chip 204.

It should be noted that, when data may be transmitted between the digital signal processor and the Bluetooth chip without using the sensor hub, for example, when there is a data transmission path between the digital signal processor and the Bluetooth chip, components connected to the data multiplexer 206 by using the interface circuit 205 are the application processor 201 and the digital signal processor 202 in FIG. 3. In other words, the component connection relationship shown in FIG. 3 is an example implementation of this embodiment of this application, and is not intended to excessively limit this embodiment of this application.

With reference to a specific example, the following further describes a solution of playing audio data over Bluetooth provided in the embodiments of this application. That audio data is music is used as an example.

Figure 4A:
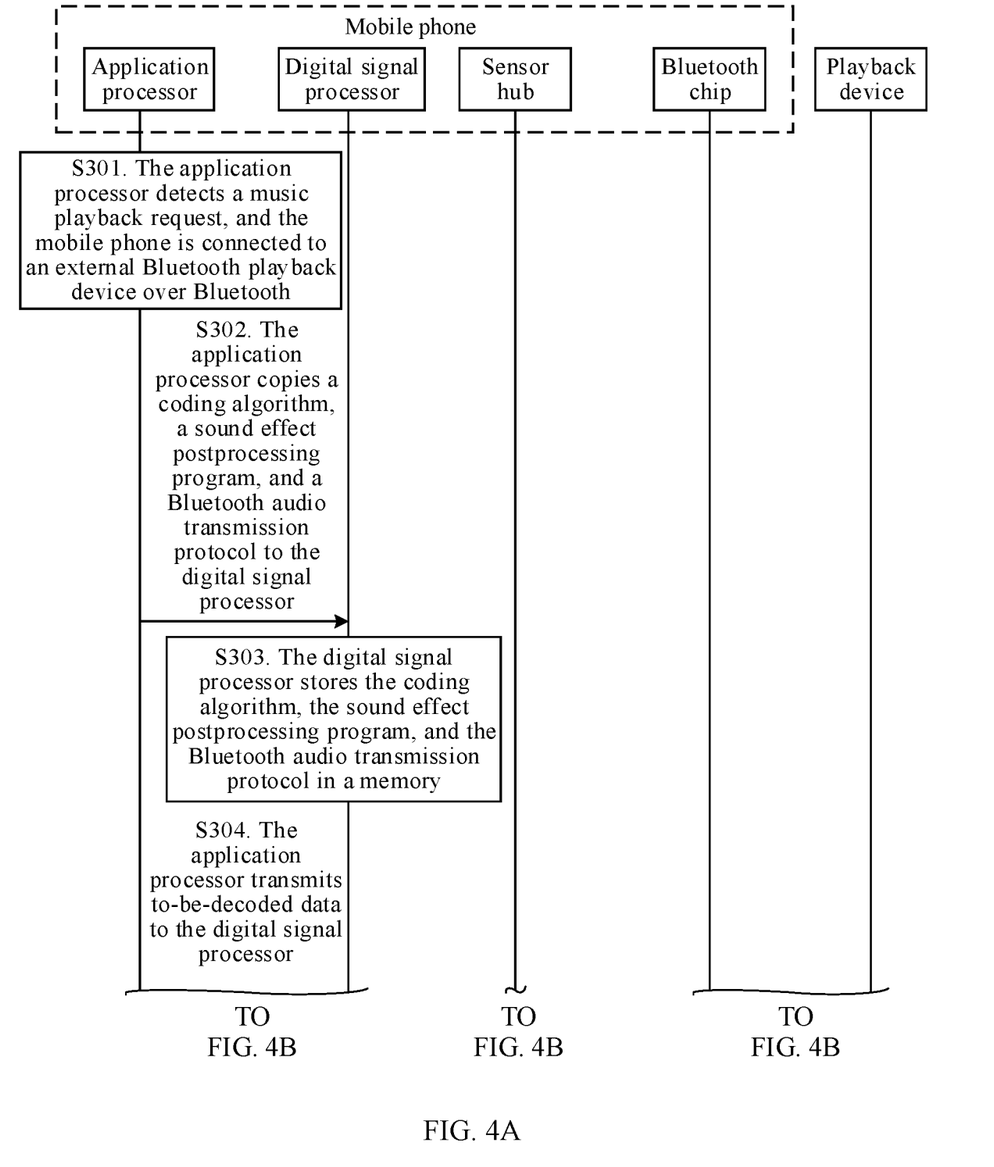
FIG. 4A and FIG. 4B are an interaction diagram of a Bluetooth-based playback method according to one embodiment.
Figure 4B:
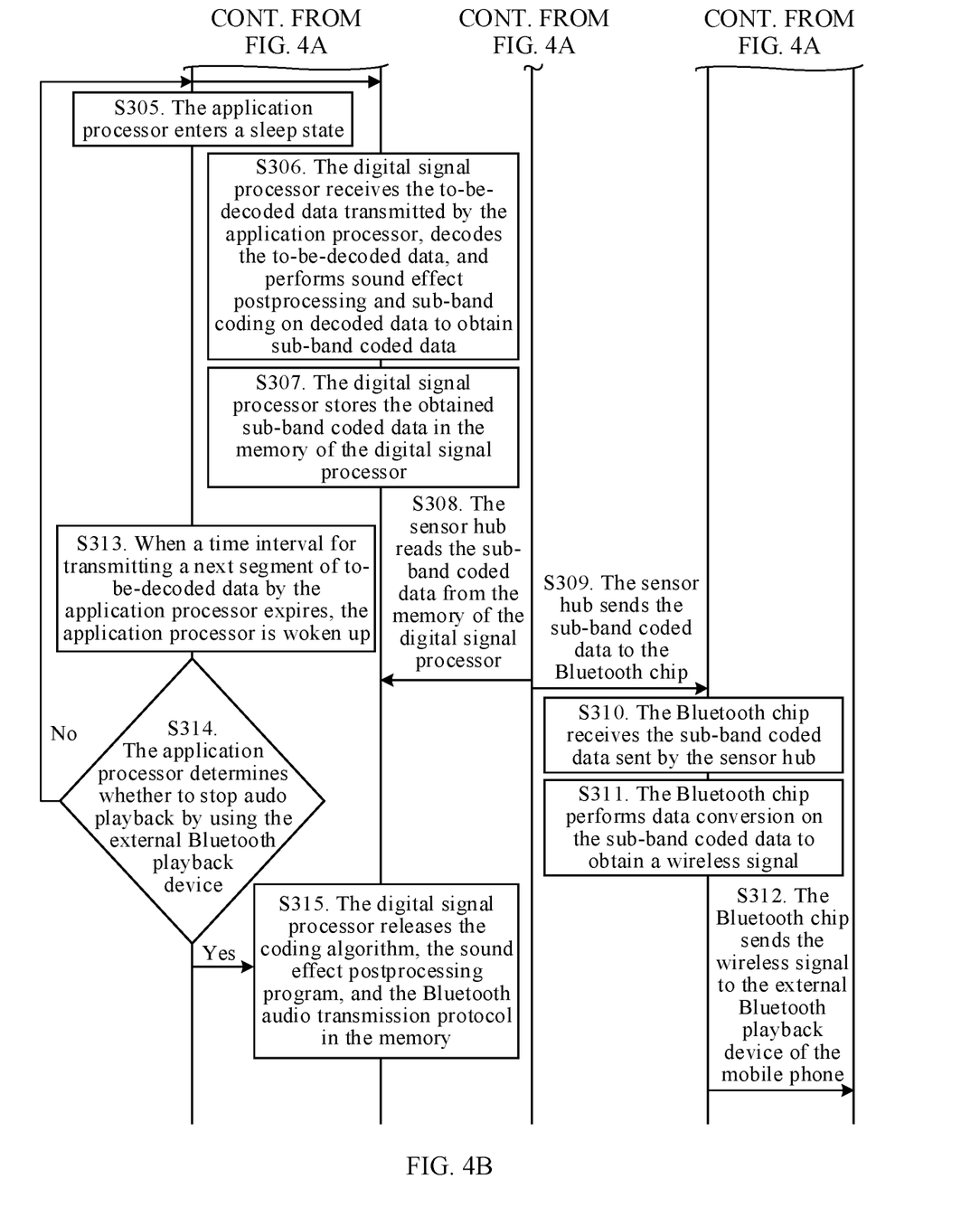

FIG. 4A and FIG. 4B are a flowchart of a method for playing music by a mobile phone over Bluetooth. The method includes S301 to S315.

S301: An application processor detects a music playback request, and the mobile phone is connected to an external Bluetooth playback device over Bluetooth.

S302: The application processor copies a coding algorithm, a sound effect postprocessing program, and a Bluetooth audio transmission protocol to a digital signal processor.

The sound effect postprocessing program is used to perform sound effect postprocessing on decoded data. The coding algorithm is used to perform sub-band coding on data obtained after sound effect postprocessing, to obtain sub-band coded data.

It should be noted that the digital signal processor may complete a process of decoding to-be-decoded data, a sound effect postprocessing process, a sub-band coding process, and the like. When the sound effect postprocessing program has been deployed in the digital signal processor, the application processor may copy, to the digital signal processor, the coding algorithm used for implementing sub-band coding and the Bluetooth audio transmission protocol used for audio data transmission. In other words, content that needs to be copied by the application processor includes but is not limited to the content mentioned in S302, and may further include more or less content. This may be specifically determined based on original functions of the application processor and the digital signal processor and functions that need to be implemented by the application processor and the digital signal processor. This is not limited herein.

S303: The digital signal processor stores the coding algorithm, the sound effect postprocessing program, and the Bluetooth audio transmission protocol in a memory.

It should be noted that S302 and S303 may be further implemented as follows: The application processor copies the coding algorithm, the sound effect postprocessing program, and the Bluetooth audio transmission protocol to the memory of the digital signal processor.

S304: The application processor transmits to-be-decoded data to the digital signal processor, where the to-be-decoded data is to-be-played audio data.

S305: The application processor enters a sleep state.

S306. The digital signal processor receives the to-be-decoded data transmitted by the application processor, decodes the to-be-decoded data, and performs sound effect postprocessing and sub-band coding on decoded data to obtain sub-band coded data.

S307: The digital signal processor stores the obtained sub-band coded data in the memory of the digital signal processor.

S308: A sensor hub reads the sub-band coded data from the memory of the digital signal processor.

It should be noted that the digital signal processor may send data to the sensor hub, to transmit the sub-band coded data stored in the memory to a Bluetooth chip by using the sensor hub. In other words, a process of reading the sub-band coded data from the memory of the digital signal processor may be triggered by the sensor hub, or may be actively performed by the digital signal processor. In other words, after completing the sub-band coding process, the digital signal processor forwards the obtained sub-band coded data to the sensor hub.

S309: The sensor hub sends the sub-band coded data to the Bluetooth chip.

S310: The Bluetooth chip receives the sub-band coded data sent by the sensor hub.

S311: The Bluetooth chip performs data conversion on the sub-band coded data to obtain a wireless signal.

S312: The Bluetooth chip sends the wireless signal to the external Bluetooth playback device of the mobile phone.

S313: When a time interval for transmitting a next segment of to-be-decoded data by the application processor expires, the application processor is woken up.

When a plurality of segments of to-be-decoded data need to be transmitted by the application processor to the digital signal processor, after the application processor enters a sleep state and a preset time interval expires for the application processor, the application processor is woken up and performs S314.

It should be noted that, in an implementation, a component such as a timer having a timing function may be disposed in the mobile phone, to complete a time interval counting process. In addition, when the specified time interval expires, a signal is transmitted to the application processor to wake up the application processor. In some embodiments, after entering a sleep state, the application processor is automatically woken up based on a specific period. The specific period may be preset, that is, duration of the foregoing time interval. The foregoing two cases are example implementations of this embodiment of this application, and are not intended to limit this application.

S314: The application processor determines whether to perform audio playback by using the external Bluetooth playback device. When the application processor determines that the mobile phone does not perform audio playback by using the external Bluetooth playback device, S315 is performed; or when the application processor determines that the mobile phone still performs audio playback by using the external Bluetooth playback device, S304 to S314 are cyclically performed.

In an implementation, for one piece of music, the music may be a segment of to-be-decoded data, or may be a plurality of segments of to-be-decoded data. When the music includes at least two segments of to-be-decoded data, each segment of to-be-decoded data may be processed according to S304 to S313, until all the segments of to-be-decoded data of the music are converted into wireless signals, or the current processing procedure ends after a process in which the mobile phone plays the music is terminated.

In other words, the digital signal processor may use a case in which playback of one piece of music ends as a trigger condition for performing S315, or the digital signal processor may perform S315 after the application processor determines that the mobile phone does not perform audio playback by using the external Bluetooth playback device. The audio playback includes but is not limited to music playback.

S315: The digital signal processor releases the coding algorithm, the sound effect postprocessing program, and the Bluetooth audio transmission protocol that are in the memory.

To reduce occupation of the memory of the digital signal processor, in an implementation of this embodiment of this application, when the application processor determines that the mobile phone does not perform audio playback by using the external Bluetooth playback device, the digital signal processor does not receive, within a period of time, the to-be-decoded data sent by the application processor. In this case, the digital signal processor releases a decoding algorithm, the sound effect post-processing program, and the Bluetooth audio transmission protocol that are stored in the memory.

It should be noted that, in the foregoing process of playing music over Bluetooth, music playback may be interrupted by a call and the like of the mobile phone. In this case, an implementation shown in FIG. 5 may be used. To be specific, after S305 in FIG. 4A and FIG. 4B is performed, the application processor may be woken up after the mobile phone receives an incoming call request.

Figure 5:
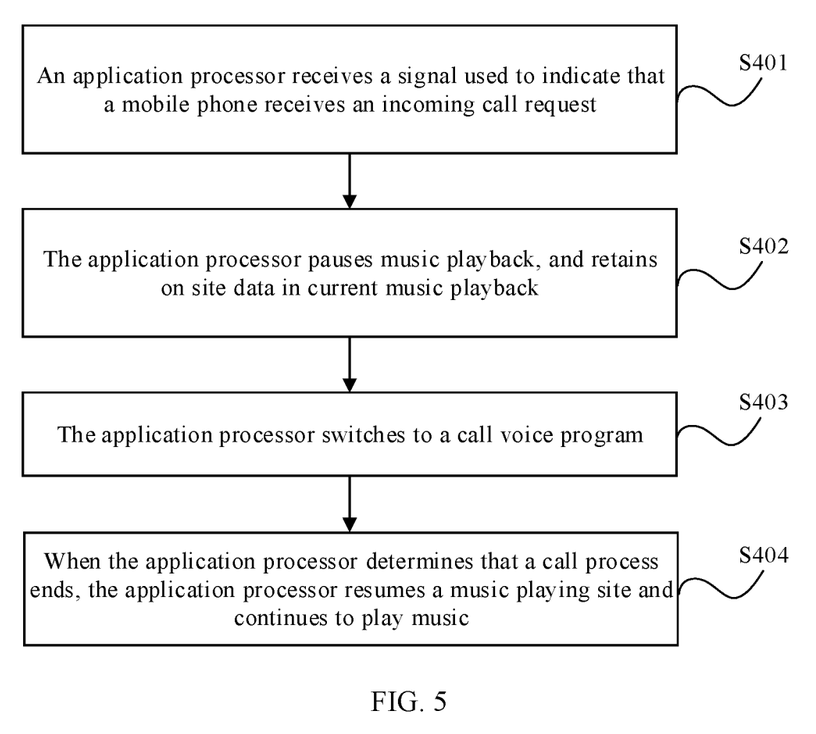
FIG. 5 is a flowchart of a Bluetooth-based playback method according to one embodiment.

FIG. 5 is a flowchart of a method performed after a mobile phone receives an incoming call in a process in which the mobile phone plays music over Bluetooth.

The method includes S401 to S404.

S401: An application processor receives a signal used to indicate that the mobile phone receives an incoming call request.

When the mobile phone receives the incoming call request, a modem (modem) of the mobile phone may send a signal to the application processor, to indicate that the mobile phone receives the incoming call request. In this case, the application processor is woken up by the modem. The incoming call may be a voice incoming call, or may be a video incoming call.

S402: The application processor pauses music playback, and retains on site data in the current music playback.

When the mobile phone is connected to the playback device over Bluetooth and there is call data that needs to be processed by the application processor, the application processor stops sending to-be-decoded data of music to the digital signal processor, and the application processor stores, in a memory of the application processor, the to-be-decoded data of the music that has not been sent to the digital signal processor.

S403: The application processor switches to a call voice program.

For the application processor, after the application processor stops sending the to-be-decoded data of the music to the digital signal processor, the digital signal processor stops decoding the to-be-decoded data. In this case, the application processor may invoke the call voice program to implement a Bluetooth-based call process. It should be noted that, for a manner of implementing a call process when the mobile phone is connected to the playback device over Bluetooth, refer to the prior art. For example, the modem of the mobile phone and another component of the mobile phone may complete a response to the incoming call request. Details are not described herein.

S404: When the application processor determines that the call process ends, the application processor resumes a music playback site and continues to play music.

In an implementation, when a user actively ends a current call process, the application processor may detect that the user touches a function key for ending the current call process. An operation of touching the function key by the user may be used as a signal for triggering the application processor to resume the music playback site.

In another implementation, when a peer user actively ends a current call process, the modem of the mobile phone may send a signal to the application processor, to indicate that the current call process ends, and trigger the application processor to resume the music playback site.

It should be noted that a manner in which the application processor determines whether a call process ends includes but is not limited to the foregoing two cases, and a determining manner of the application processor is not limited herein.

When the application processor determines that a call of the mobile phone is interrupted, the application processor may automatically resume the music playback site, in other words, continue to transmit, to the digital signal processor, to-be-decoded data that is not transmitted to the digital signal processor, to continue to play music over Bluetooth, in other words, continue to perform the procedure shown in S304 to S315 in FIG. 4A and FIG. 4B.

It can be learned that, for the mobile phone, in a process in which the mobile phone plays music over Bluetooth, the digital signal processor completes a sub-band coding process, and the application processor may enter a sleep state after transmitting to-be-decoded data. When the mobile phone performs a service such as a call over Bluetooth, sub-band coding on decoded data is still performed by the application processor.

In various embodiments, the electronic device may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in the embodiments of this application, module division is an example, and is merely a logical function division. During actual implementation, another division manner may be used.

Figure 6:
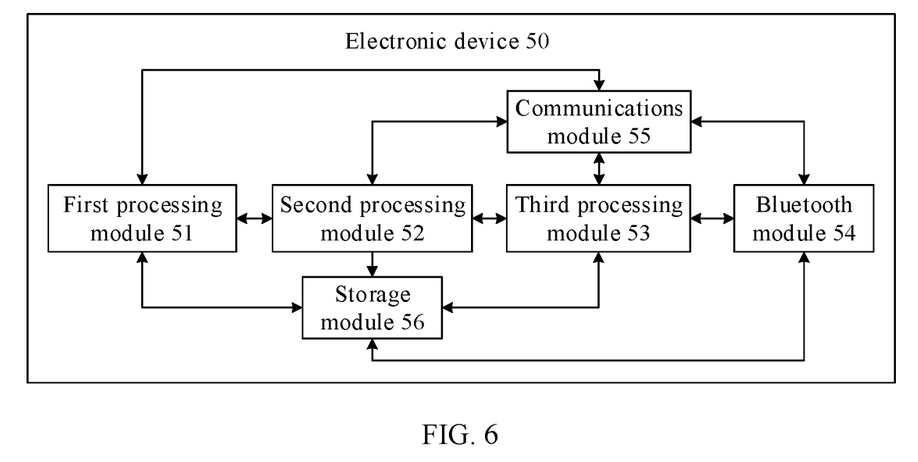
FIG. 6 is a schematic structural diagram 4 of an electronic device according to one embodiment.

FIG. 6 is one example schematic structural diagram of the electronic device in the foregoing embodiments. An electronic device 50 includes a first processing module 51, a second processing module 52, a third processing module 53, and a Bluetooth module 54.

The first processing module 51 is configured to support the electronic device 50 in copying content such as a coding algorithm (for example, a sub-band coding algorithm), a sound effect postprocessing program, and a Bluetooth audio transmission protocol, in other words, copying the foregoing enumerated content to the second processing module 52. The first processing module 51 is configured to support the electronic device 50 in transmitting first to-be-decoded data (for example, the first segment of to-be-decoded data in audio data that is to be played by the electronic device 50, or a next segment of to-be-decoded data that needs to be played and that is in audio data that is being played by the electronic device 50) to the second processing module 52. After the foregoing to-be-decoded data is transmitted, the first processing module 51 enters a sleep state.

The second processing module 52 is configured to support the electronic device 50 in receiving the first to-be-decoded data transmitted by the first processing module 51, and performing decoding, sound effect postprocessing, and coding on the first to-be-decoded data to obtain first coded data (for example, first sub-band coded data obtained by processing the first to-be-decoded data). The second processing module 52 is configured to support the electronic device 50 in sending the first coded data to the Bluetooth module 54 by using the third processing module 53.

The Bluetooth module 54 is configured to support the electronic device 50 in converting the first coded data into a first wireless signal, and sending the first wireless signal to an external playback device of the electronic device 50 to implement audio playback.

In an implementation, after the first processing module 51 enters a sleep state, the first processing module 51 is woken up when a preset time interval expires. When the first processing module 51 determines that there is second to-be-decoded data, the first processing module 51 is configured to support the electronic device 50 in transmitting the second to-be-decoded data to the second processing module 52 (for example, to-be-decoded data corresponding to a second radio signal that needs to be played after the first radio signal in an audio playback process). The second processing module 52 is configured to support the electronic device 50 in receiving and processing the second to-be-decoded data to obtain second coded data, and sending the second coded data to the Bluetooth module 54 by using the third processing module 53. The Bluetooth module 54 is configured to support the electronic device 50 in converting the second coded data into the second wireless signal, and sending the second wireless signal to the playback device. That the second processing module 52 processes the second to-be-decoded data includes: performing decoding, sound effect post-processing, and coding on the second to-be-decoded data to obtain the second coded data.

In an implementation, after the first processing module 51 transmits the second to-be-decoded data to the second processing module 52, the second processing module 52 enters a sleep state.

In an implementation, after the first processing module 51 enters a sleep state, the first processing module 51 is configured to support the electronic device 50 in receiving a signal used to indicate that the electronic device 50 receives an incoming call request. The first processing module 51 is woken up. The first processing module 51 is configured to support the electronic device 50 in stopping audio playback, and retaining current audio playback data. Then the first processing module 51 switches to a call voice program.

In an implementation, after the first processing module 51 switches to the call voice program, after a call ends, the first processing module 51 is configured to support the electronic device 50 in resuming the audio playback, and sending a next segment of to-be-decoded data to the second processing module 52.

In an implementation of this embodiment of this application, the electronic device 50 may further include a communications module 55 and a storage module 56. The communications module 55 is configured to: support data exchange between any two of the first processing module 51, the second processing module 52, the third processing module 53, the Bluetooth module 54, and the storage module 56 in the electronic device 50; and/or support communication between the electronic device 50 and another external device of the electronic device 50 such as the playback device. The storage module 56 is configured to support the electronic device 50 in storing program code and data of the electronic device.

It should be noted that each processing module above may be implemented as a processor or a controller, such as a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. For example, in this embodiment of this application, the first processing module 51 may be implemented as an application processor, the second processing module 52 may be implemented as a digital signal processor, the third processing module 53 may be implemented as a microprocessor such as a sensor hub, the Bluetooth module 54 may be implemented as a Bluetooth chip, the communications module 55 may be implemented as a transceiver, a transceiver circuit, a communications interface, or the like, and the storage module 56 may be implemented as a memory.

Figure 7:
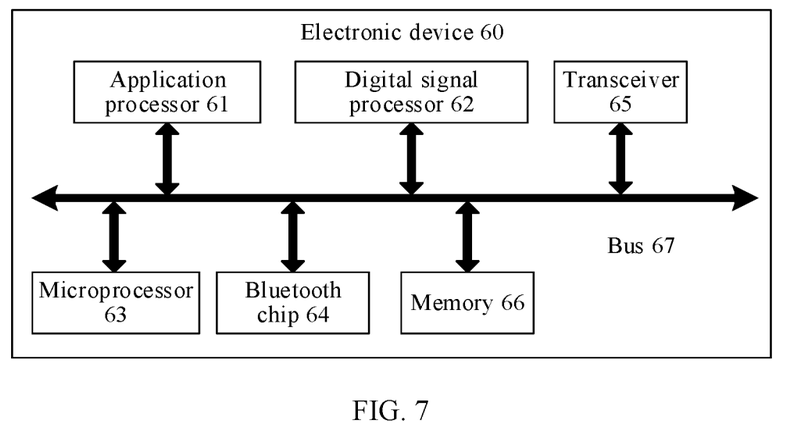
FIG. 7 is a schematic structural diagram 5 of an electronic device according to one embodiment.

As shown in FIG. 7, an electronic device 60 includes an application processor 61, a digital signal processor 62, a microprocessor 63, a Bluetooth chip 64, a transceiver 65, a memory 66, and a bus 67. The application processor 61, the digital signal processor 62, the microprocessor 63, the Bluetooth chip 64, the transceiver 65, and the memory 66 may be connected to each other by using the bus 67. The bus 67 may be a peripheral component interconnect (Peripheral Component Interconnect, PCI) bus an extended industry standard architecture (Extended Industry Standard Architecture, EISA) bus, or the like. The bus may be classified into an address bus, a data bus, a control bus, and the like. For ease of representation, only one thick line is used to represent the bus in FIG. 7, but this does not mean that there is only one bus or only one type of bus.

Method or algorithm steps described in combination with the content disclosed in this application may be implemented by hardware, or may be implemented by a processor by executing a software instruction. The software instruction may include a corresponding software module. The software module may be stored in a random access memory (Random Access Memory, RAM), a flash memory, a read-only memory (Read Only Memory, ROM), an erasable programmable read-only memory (Erasable Programmable ROM, EPROM), an electrically erasable programmable read-only memory (Electrically EPROM, EEPROM), a register, a hard disk, a removable hard disk, a compact disc read-only memory (Compact Disc Read-Only Memory, CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be deployed in a same device, or the processor and the storage medium may be deployed in different devices as discrete components.

One embodiment provides a readable storage medium. The readable storage medium stores an instruction. When the instruction is run on an electronic device, the electronic device is enabled to perform any one of the foregoing method embodiments.

One embodiment provides a computer program product. The computer program product includes software code, and the software code is used to perform any one of the foregoing method embodiments.

A person skilled in the art should be aware that, in the foregoing one or more examples, functions described in the embodiments of this application may be implemented by hardware, software, firmware, or any combination thereof. When the present invention is implemented by software, the foregoing functions may be stored in a computer readable medium or transmitted as one or more instructions or code in the computer readable medium. The computer readable medium includes a computer storage medium and a communications medium. The communications medium includes any medium that enables a computer program to be transmitted from one place to another. The storage medium may be any available medium accessible to a general-purpose or dedicated computer.

The foregoing descriptions are merely specific implementations of this application, but are not intended to limit the protection scope of this application. Any variation or replacement readily figured out by a person skilled in the art within the technical scope disclosed in the present invention shall fall within the protection scope of this application. Therefore, the protection scope of this application shall be subject to the protection scope of the claims.

What is claimed is:

1. A Bluetooth-based playback method, wherein the method is applied to an electronic device, wherein the electronic device comprises a first processor, a second processor, a third processor, and a Bluetooth module, the first processor is communicatively connected to the second processor, the second processor is communicatively connected to the third processor, and the third processor is communicatively connected to the Bluetooth module, and wherein the method comprises:

copying, by the first processor, a coding algorithm, a sound effect post-processing program, and a Bluetooth audio transmission protocol to the second processor;

transmitting, by the first processor, first to-be-decoded data to the second processor, wherein the first to-be-decoded data is to-be-played audio data;

entering, by the first processor, a sleep state;

receiving, by the second processor, the first to-be-decoded data transmitted by the first processor, and performing decoding, sound effect post-processing, and coding on the first to-be-decoded data to obtain first coded data;

sending, by the second processor, the first coded data to the Bluetooth module using the third processor; and converting, by the Bluetooth module, the first coded data into a first wireless signal, and sending the first wireless signal to an external playback device of the electronic device to implement audio playback, wherein the electronic device is communicatively connected to the playback device over Bluetooth;

wherein after entering, by the first processor, the sleep state, the method further comprises:

receiving, by the first processor, a signal indicating that the electronic device receives an incoming call request;

waking up the first processor;

stopping, by the first processor, audio playback, and retaining current audio playback data; and switching to, by the first processor, a call voice program.

2. The method according to claim 1, wherein after entering, by the first processor, the sleep state, the method comprises:

waking up the first processor when a preset time interval expires;

when the first processor determines that there is second to-be-decoded data, transmitting, by the first processor, the second to-be-decoded data to the second processor, wherein the second to-be-decoded data is to-be-played audio data;

receiving and processing, by the second processor, the second to-be-decoded data to obtain second coded data, and sending the second coded data to the Bluetooth module using the third processor; and converting, by the Bluetooth module, the second coded data into a second wireless signal, and sending the second wireless signal to the playback device, wherein the processing, by the second processor, of the second to-be-decoded data comprises:

performing decoding, sound effect post-processing, and coding on the second to-be-decoded data to obtain the second coded data.

3. The method according to claim 2, wherein after transmitting, by the first processor, the second to-be-decoded data to the second processor, the method further comprises:

entering, by the first processor, the sleep state.

4. The method according to claim 1, wherein after switching to, by the first processor, the call voice program, the method further comprises:

after a call ends, resuming, by the first processor, the audio playback, and sending a next segment of to-be-decoded data to the second processor.

5. The method according to claim 1, wherein the first processor is an application processor.

6. The method according to claim 1, wherein the second processor is a digital signal processor.

7. The method according to claim 1, wherein the third processor is a microprocessor.

8. An electronic device, wherein the electronic device comprises a first processor, a second processor, a third processor, and a Bluetooth module, the first processor is communicatively connected to the second processor, the second processor is communicatively connected to the third processor, and the third processor is communicatively connected to the Bluetooth module, wherein the first processor is configured to copy a coding algorithm, a sound effect post-processing program, and a Bluetooth audio transmission protocol to the second processor;

the first processor is configured to transmit first to-be-decoded data to the second processor, wherein the first to-be-decoded data is to-be-played audio data;

the first processor is configured to enter a sleep state;

the second processor is configured to: receive the first to-be-decoded data transmitted by the first processor, and perform decoding, sound effect post-processing, and coding on the first to-be-decoded data to obtain first coded data;

the second processor is configured to send the first coded data to the Bluetooth module using the third processor; and the Bluetooth module is configured to: convert the first coded data into a first wireless signal, and send the first wireless signal to an external playback device of the electronic device to implement audio playback, wherein the electronic device is communicatively connected to the playback device over Bluetooth;

wherein after the first processor enters a sleep state,
the first processor is configured to receive a signal indicating that the electronic device receives an incoming call request;
the first processor is configured to be woken up;
the first processor is configured to: stop audio playback, and retain current audio playback data; and
the first processor is configured to switch to a call voice program.

9. The electronic device according to claim 8, wherein after the first processor enters a sleep state,
the first processor is configured to be woken up when a preset time interval expires;
the first processor is configured to: when the first processor determines that there is second to-be-decoded data, transmit the second to-be-decoded data to the second processor, wherein the second to-be-decoded data is to-be-played audio data;
the second processor is configured to: receive and process the second to-be-decoded data to obtain second coded data, and send the second coded data to the Bluetooth module using the third processor; and
the Bluetooth module is configured to: convert the second coded data into a second wireless signal, and send the second wireless signal to the playback device, wherein
the processing, by the second processor, of the second to-be-decoded data comprises: performing decoding, sound effect post-processing, and coding on the second to-be-decoded data to obtain the second coded data.

10. The electronic device according to claim 9, wherein after the first processor transmits the second to-be-decoded data to the second processor,
the first processor is configured to enter the sleep state.

11. The electronic device according to claim 8, wherein after the first processor switches to the call voice program,
the first processor is configured to: after a call ends, resume the audio playback, and send a next segment of to-be-decoded data to the second processor.

12. The electronic device according to claim 8, wherein the first processor is an application processor.

13. The electronic device according to claim 8, wherein the second processor is a digital signal processor.

14. The electronic device according to claim 8, wherein the third processor is a microprocessor.

15. A non-transitory computer program product comprising computer-executable instructions that are stored on a non-transitory computer-readable medium and that, when executed by a processor, are configured to cause an electronic device to:
copy, by a first processor, a coding algorithm, a sound effect post-processing program, and a Bluetooth audio transmission protocol to a second processor, wherein the electronic device comprises the first processor, the second processor, a third processor, and a Bluetooth module;
transmit, by the first processor, first to-be-decoded data to the second processor, wherein the first to-be-decoded data is to-be-played audio data;
enter, by the first processor, a sleep state;
receive, by the second processor, the first to-be-decoded data transmitted by the first processor, and performing decoding, sound effect post-processing, and coding on the first to-be-decoded data to obtain first coded data;
send, by the second processor, the first coded data to the Bluetooth module using the third processor; and
convert, by the Bluetooth module, the first coded data into a first wireless signal, and sending the first wireless signal to an external playback device of the electronic device to implement audio playback, wherein the electronic device is communicatively connected to the playback device over Bluetooth;
wherein after entering, by the first processor, the sleep state, the computer-executable instructions are configured to further cause the electronic device:
receive, by the first processor, a signal indicating that the electronic device receives an incoming call request;
wake up the first processor;
stop, by the first processor, audio playback, and retaining current audio playback data; and
switch to, by the first processor, a call voice program.

16. The computer program product according to claim 15, wherein the first processor is an application processor.

17. The computer program product according to claim 15, wherein the second processor is a digital signal processor.

* * * * *

UNITED STATES PATENT AND TRADEMARK OFFICE
CERTIFICATE OF CORRECTION

PATENT NO. : 11,310,646 B2
APPLICATION NO. : 17/043665
DATED : April 19, 2022
INVENTOR(S) : Tao Yi et al.

It is certified that error appears in the above-identified patent and that said Letters Patent is hereby corrected as shown below:

On the Title Page

In item (57), in Column 2, in "Abstract", Line 8, delete "post-processing," and insert
-- postprocessing, --.

Signed and Sealed this
Second Day of August, 2022

Katherine Kelly Vidal
*Director of the United States Patent and Trademark Office*